(12) United States Patent
Matsui

(10) Patent No.: US 9,384,173 B2
(45) Date of Patent: Jul. 5, 2016

(54) INFORMATION PROCESSING APPARATUS HAVING PAGE PREVIEW FUNCTION, METHOD OF CONTROLLING THE SAME, AND STORAGE MEDIUM

(75) Inventor: Kenta Matsui, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 371 days.

(21) Appl. No.: 13/468,543

(22) Filed: May 10, 2012

(65) Prior Publication Data

US 2012/0290929 A1 Nov. 15, 2012

(30) Foreign Application Priority Data

May 10, 2011 (JP) .................................. 2011-105087

(51) Int. Cl.
*G06F 17/30* (2006.01)
*G06F 17/21* (2006.01)

(52) U.S. Cl.
CPC .................................... *G06F 17/212* (2013.01)

(58) Field of Classification Search
CPC ... G06F 17/211; G06F 17/212; G06F 17/217; G06F 17/273; G06F 17/3002
USPC .......................................... 715/251, 274, 277
See application file for complete search history.

(56) References Cited

U.S. PATENT DOCUMENTS

| | | | | |
|---|---|---|---|---|
| 4,651,278 A * | 3/1987 | Herzog et al. | ................ | 358/1.18 |
| 5,241,474 A * | 8/1993 | Marovac | ............... | G06F 17/217 355/24 |
| 7,412,647 B2 * | 8/2008 | Sellers et al. | ................. | 715/253 |
| 2006/0170948 A1 * | 8/2006 | Kobashi | ....................... | 358/1.13 |
| 2007/0226748 A1 | 9/2007 | Mizutani | | |
| 2008/0033969 A1 * | 2/2008 | Koo et al. | ..................... | 707/100 |
| 2009/0086238 A1 * | 4/2009 | Dozier | ........................ | 358/1.13 |
| 2009/0144616 A1 * | 6/2009 | Mori | ............................. | 715/247 |
| 2010/0115189 A1 * | 5/2010 | Lin et al. | ...................... | 711/103 |
| 2012/0159313 A1 * | 6/2012 | Dejean | .................. | G06F 17/212 715/247 |

FOREIGN PATENT DOCUMENTS

| | | |
|---|---|---|
| JP | 64003770 A | 1/1989 |
| JP | 2000181673 A | 6/2000 |
| JP | 2004202928 A | 7/2004 |
| JP | 2007-249301 A | 9/2007 |
| JP | 2007259353 A | 10/2007 |
| JP | 2009080551 A | 4/2009 |

OTHER PUBLICATIONS

Office Action issued in JP2011-105087, mailed Mar. 17, 2015.
Japanese Office Action issued in Japanese counterpart application No. JP2011-105087, dated Sep. 8, 2015.

* cited by examiner

*Primary Examiner* — Scott Baderman
*Assistant Examiner* — Hassan Mrabi
(74) *Attorney, Agent, or Firm* — Rossi, Kimms & McDowell LLP

(57) ABSTRACT

An information processing apparatus having a display function capable of easily designating a page and skipping pages to a page desired to be displayed. A CPU displays data on a page-by-page basis according to a display instruction. The CPU extracts consecutive pages of each of document sections of the data, as logical pages, in association with physical page numbers each sequentially assigned to each at least one of the pages of the data. The CPU decides a leading logical page of each document section, as a reference logical page, and gives the display instruction so as to cause a display unit to consecutively display a plurality of reference logical pages.

15 Claims, 19 Drawing Sheets

FIG. 3A

```
%PDF-1.6
...
1 0 obj
<</Type /Catalog
    /PageLabeles << /Nums [ 0 << /S /r >>
                            3 << /S /D >> ]
         >>
>>
...
Endobj
...
%%EOF
```

```
...
   <Glyphs BidiLevel="0" Fill="#FF000000"
   FontUri="/Resources/0D03587F-7D30.odttf"
   FontRenderingEmSize="8.04"StyleSimulations="None"OriginX="532.9"
   OriginY="44.16" UnicodeString="i">
   </Glyphs>
...
```

```
...
   <Glyphs BidiLevel="0" Fill="#FF000000"
   FontUri="/Resources/0D03587F-7D30.odttf"
   FontRenderingEmSize="8.04"StyleSimulations="None"OriginX="532.9"
   OriginY="44.16" UnicodeString="ii">
   </Glyphs>
...
```

```
...
```

```
...
   <Glyphs BidiLevel="0" Fill="#FF000000"
   FontUri="/Resources/0D03587F-7D30.odttf"
   FontRenderingEmSize="8.04"StyleSimulations="None"OriginX="532.9"
   OriginY="44.16" UnicodeString="1">
   </Glyphs>
...
```

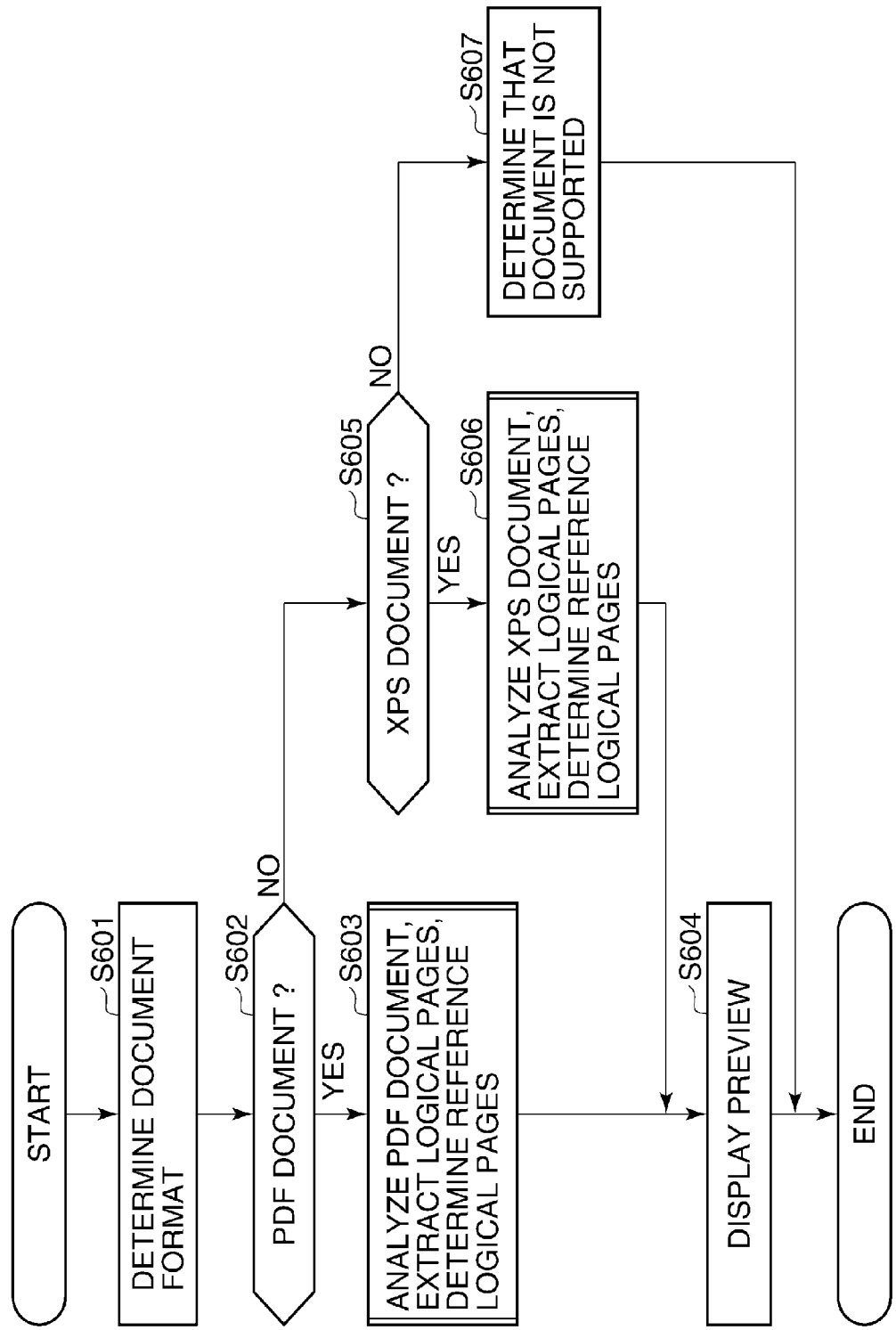

FIG. 9

| PHYSICAL PAGE | CHARACTER STRING | (ASCII CODE) | X | Y | FONT |
|---|---|---|---|---|---|
| 1 | i | 0x69 | 532.9 | 44.16 | 0D03587F-7D30.odttf |
| 2 | ii | 0x69 0x69 | 532.9 | 44.16 | 0D03587F-7D30.odttf |
| 3 | iii | 0x69 0x69 0x69 | 532.9 | 44.16 | 0D03587F-7D30.odttf |
| 4 | 1 | 0x31 | 532.9 | 44.16 | 0D03587F-7D30.odttf |
| 5 | 2 | 0x32 | 532.9 | 44.16 | 0D03587F-7D30.odttf |
| 6 | 3 | 0x33 | 532.9 | 44.16 | 0D03587F-7D30.odttf |
| 7 | 4 | 0x34 | 532.9 | 44.16 | 0D03587F-7D30.odttf |
| 8 | 5 | 0x35 | 532.9 | 44.16 | 0D03587F-7D30.odttf |

| | |
|---|---|
| JOB START | 1301 |
| MEDIA START | 1302 |
| PAGE START (PAGE 1) | 1303 |
| DRAWING COMMAND | 1304 |
| PAGE END | 1305 |
| PAGE START (PAGE 2) | |
| DRAWING COMMAND | |
| PAGE END | |
| PAGE START (PAGE 3) | |
| DRAWING COMMAND | |
| PAGE END | |
| PAGE START (PAGE 4) | |
| DRAWING COMMAND | |
| PAGE END | |
| MEDIA END | 1306 |
| JOB END | 1307 |

AB CD AB CD ··········

INFORMATION PROCESSING APPARATUS HAVING PAGE PREVIEW FUNCTION, METHOD OF CONTROLLING THE SAME, AND STORAGE MEDIUM

BACKGROUND OF THE INVENTION

1. Field of the Invention

The present invention relates to an information processing apparatus having a preview function, a method of controlling the information processing apparatus, and a storage medium, and more particularly to a technique for previewing document data, such as image data, in the information processing apparatus.

2. Description of the Related Art

In general, an image processing apparatus, which is one of information processing apparatuses, is equipped with a preview function for previewing document data, such as image data, stored in the image processing apparatus. By using the preview function, a user can designate a desired page of the document data and preview the designated page.

For example, there is proposed an image processing apparatus that generates preview information according to a preview command on a physical page-by-physical page basis, and displays a preview image according to the preview information (see Japanese Patent Laid-Open Publication No. 2007-249301).

In Japanese Patent Laid-Open Publication No. 2007-249301, however, pages that can be designated by the user are limited to physical pages of the document data, and hence in the case of document data in which logical pages are different from physical pages, it is troublesome for the user to designate preview of pages of the document data.

FIG. 19 illustrates an example of the document data in which logical pages are different from physical pages.

In FIG. 19, let it be assumed that Roman numerals are assigned to the "table of contents" of the document data as page numbers thereof, and Arabic numerals are assigned to the "main body" thereof as page numbers thereof. Although such assignment of page numbers is a generally familiar example, when the document data is to be previewed, there can arise the following problem:

If the user designates page 4 with an intention to preview the fourth page of the "main body", it can happen that the first page of the main body, which happens to correspond to a fourth page of all the physical pages including the pages of the "table of contents", is previewed. Therefore, it is very troublesome to designate a page that the user desires to preview.

Further, when the user desires to skip the "table of contents" so as to preview the "main body", it is required to sequentially turn the pages of the "table of contents" one by one, or after grasping the total number of the pages of the "table of contents", designate a desired physical page of the "main body". In short, it is impossible for the user to skip pages to the desired page.

SUMMARY OF THE INVENTION

The present invention provides an information processing apparatus having a preview function which is capable of facilitating designation of a desired page and skipping pages to a page desired to be previewed, a method of controlling the information processing apparatus, and a storage medium.

In a first aspect of the present invention, there is provided an information processing apparatus that stores data having a plurality of pages, comprising a display unit configured to display the data on a page-by-page basis according to a display instruction, an extraction unit configured to extract consecutive pages of each of document sections of the data, as logical pages, in association with physical page numbers each sequentially assigned to each at least one of the pages of the data, a decision unit configured to decide a leading logical page of each document section, as a reference logical page, and an instruction unit configured to give the display instruction so as to cause the display unit to consecutively display a plurality of reference logical pages decided by the decision unit.

In a second aspect of the present invention, there is provided an information processing apparatus information processing apparatus that stores data having a plurality of pages, comprising a display unit configured to display the data on a page-by-page basis according to a display instruction, and an extraction unit configured to extract consecutive pages of each of document sections of the data, as logical pages, in association with physical page numbers each sequentially assigned to each at least one of the pages of the data, wherein when the data is displayed by the display unit, the display unit displays display information indicative of a total number of physical pages contained in the data, information indicative of a total number of logical pages of a document section including a page being displayed, and information indicative of a position of the page being displayed in a sequence of all of the logical pages.

In a third aspect of the present invention, there is provided a method of controlling an information processing apparatus that stores data having a plurality of pages, and displays the data on a page-by-page basis according to a display instruction, comprising extracting consecutive pages of each of document sections of the data, as logical pages, in association with physical page numbers each sequentially assigned to each at least one of the pages of the data, deciding a leading logical page of each document section, as a reference logical page, generating data configuration information in which consecutive logical pages following each of reference logical pages are sequentially connected, in association with a file name indicative of the data, and displaying the data as an image on a screen on a page-by-page basis by referring to the data configuration information according to a number of the reference logical page and a number of the logical page instructed by the display instruction.

In a fourth aspect of the present invention, there is provided a method 1 of controlling an information processing apparatus that stores data having a plurality of pages, and displays the data on a page-by-page basis according to a display instruction, comprising extracting consecutive pages of each of document sections of the data, as logical pages, in association with physical page numbers each sequentially assigned to each at least one of the pages of the data, and displaying, when the data is displayed, information indicative of a total number of physical pages contained in the data, information indicative of a total number of logical pages of a document section including a page being displayed, and information indicative of a position of the page being displayed in a sequence of all of the logical pages.

In a fifth aspect of the present invention, there is provided a non-transitory computer-readable storage medium storing a computer-executable program for causing a computer to execute a method of controlling an method of controlling an information processing apparatus that stores data having a plurality of pages, and displays the data on a page-by-page basis according to a display instruction, wherein the method comprises extracting consecutive pages of each of document sections of the data, as logical pages, in association with physical page numbers each sequentially assigned to each at least one of the pages of the data, deciding a leading logical page of each document section, as a reference logical page, generating data configuration information in which consecutive logical pages following each of reference logical pages are sequentially connected, in association with a file name indicative of the data, and displaying the data as an image on a screen on a page-by-page basis by referring to the data configuration information according to a number of the reference logical page and a number of the logical page instructed by the display instruction.

In a sixth aspect of the present invention, there is provided a non-transitory computer-readable storage medium storing a computer-executable program for causing a computer to execute a method of controlling an method of controlling an information processing apparatus that stores data having a plurality of pages, and displays the data on a page-by-page basis according to a display instruction, wherein the method comprises extracting consecutive pages of each of document sections of the data, as logical pages, in association with physical page numbers each sequentially assigned to each at least one of the pages of the data, and displaying, when the data is displayed, information indicative of a total number of physical pages contained in the data, information indicative of a total number of logical pages of a document section including a page being displayed, and information indicative of a position of the page being displayed in a sequence of all of the logical pages.

According to the present invention, it is possible not only to easily designate a page that the user desires to preview but also to skip pages to the desired page.

Further features of the present invention will become apparent from the following description of exemplary embodiments with reference to the attached drawings.

BRIEF DESCRIPTION OF THE DRAWINGS

FIGS. 3A and 3B are diagrams showing examples of PDF document data stored in the printing apparatus shown in FIG. 1, in which FIG. 3A illustrates an example of the PDF document data, and FIG. 3B illustrates a binary representation (in hexadecimal) of the PDF document data.

FIGS. 4A and 4B are diagrams showing examples of XPS document data stored in the printing apparatus shown in FIG. 1, in which FIG. 4A illustrates a sample of the XPS document data, and FIG. 4B illustrates a binary representation (in hexadecimal) of the XPS document data.

FIG. 5 is a flowchart of a preview process performed by the printing apparatus shown in FIG. 1.

FIG. 9 is a diagram showing an example of character string information stored by a document analysis section appearing in FIG. 2.

FIGS. 10A and 10B are views useful in explaining a preview display performed by a document management section appearing in FIG. 2, in which FIG. 10A illustrates a state of an initial user interface displayed when the PDF document data or the XPS document data is previewed, and FIG. 10B illustrates a state of a user interface displayed when a next reference logical page is previewed.

FIGS. 12A and 12B are diagrams useful in explaining the data structure of the PDL data illustrated in FIG. 11, in which FIG. 12A illustrates the data structure of the PDL data, and FIG. 12B illustrates a binary representation (in hexadecimal) of leading 4 bytes of the PDL data.

DESCRIPTION OF THE EMBODIMENTS

The present invention will now be described in detail below with reference to the accompanying drawings showing embodiments thereof.

Figure 1:
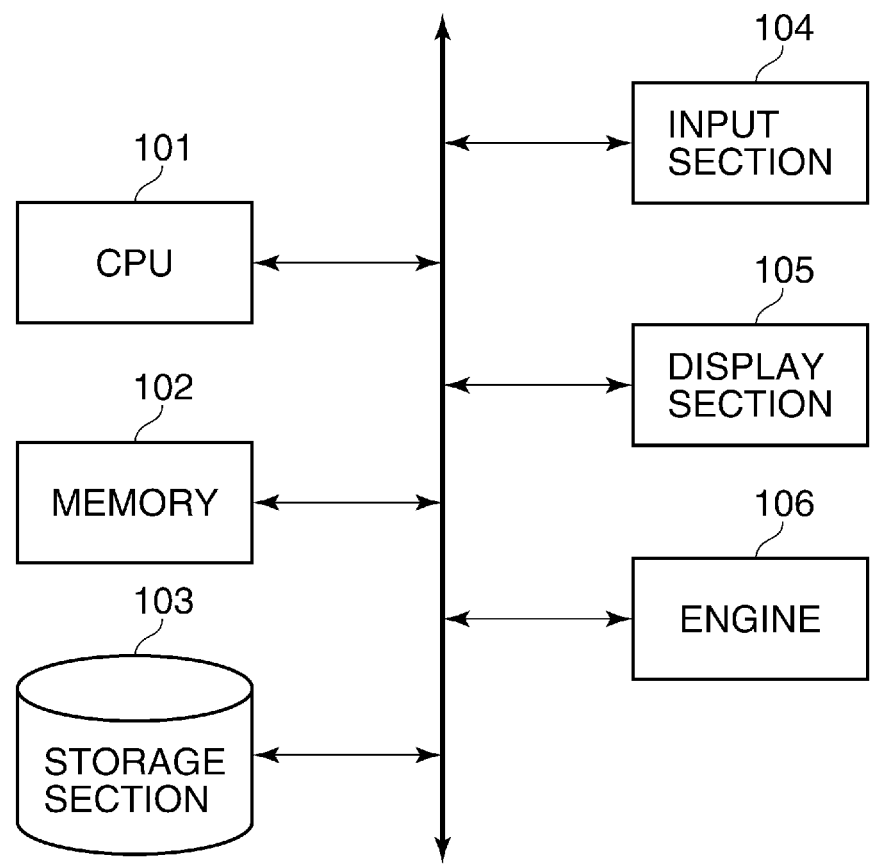
FIG. 1 is a block diagram of the hardware configuration of a printing apparatus, which is an example of an information processing apparatus according to a first embodiment of the present invention.

FIG. 1 is a block diagram of the hardware configuration of a printing apparatus, which is an example of an information processing apparatus according to a first embodiment of the present invention.

The illustrated information processing apparatus is a printing apparatus, such as a printer, and is capable of performing a preview of data, such as document data, on a page-by-page basis, as described hereinafter. The printing apparatus comprises a CPU (central processing unit) 101, and various types of software modules operate on the CPU 101.

A memory 102 is a RAM (random access memory) accessible by the CPU 101, and is used as a memory area necessary for operations of the software modules. A storage section 103 is a hard disk, for example, and document data for preview is stored in the storage section 103. An input section 104 is an operation panel for receiving an input from a user. A display section 105 is a display device for displaying an image generated based on document data on a screen. An engine 106 is for printing the image generated based on the document data on a sheet.

Figure 2:
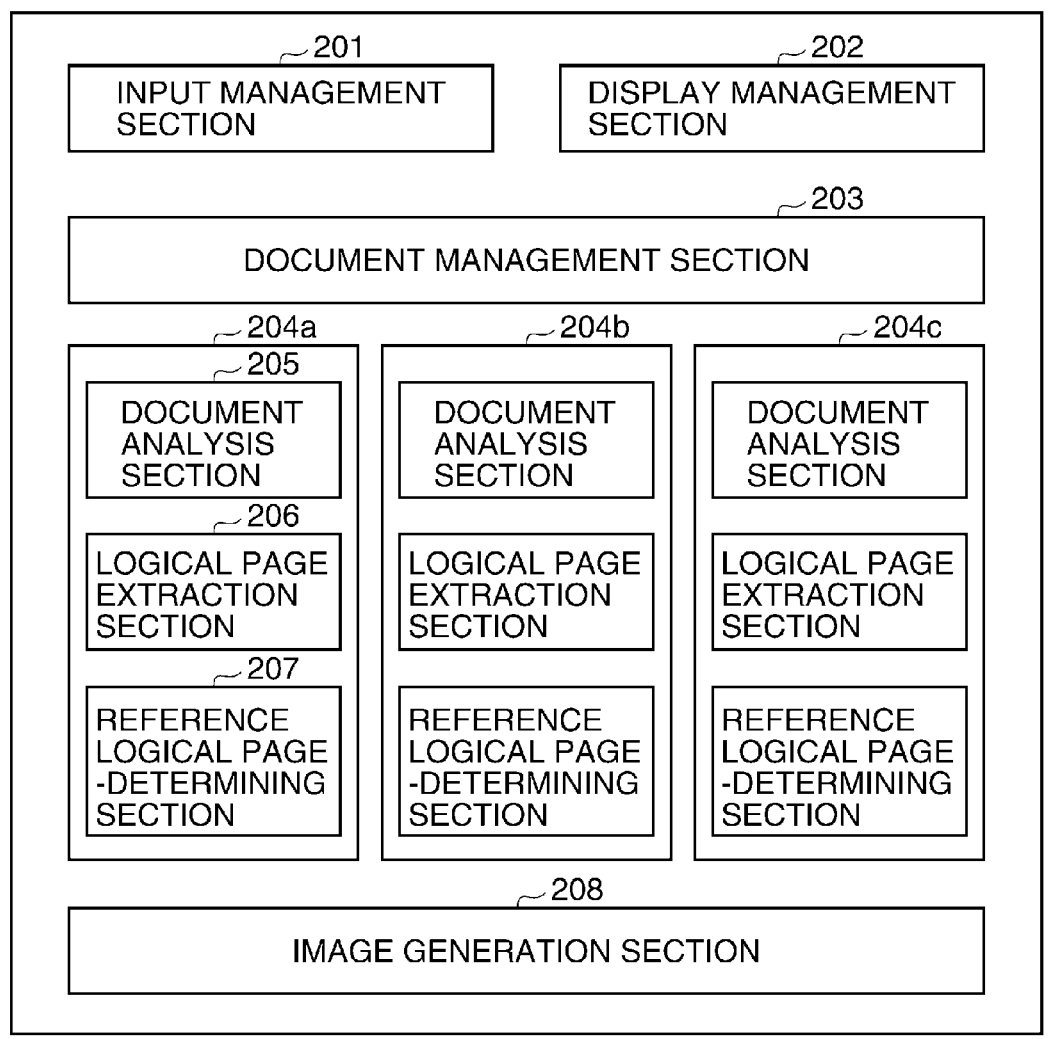
FIG. 2 is a diagram showing an example of the configuration of software modules of the printing apparatus shown in FIG. 1, for displaying images generated based on document data.

FIG. 2 illustrates an example of software modules of the printing apparatus shown in FIG. 1, for displaying images generated based on document data.

The printing apparatus shown in FIG. 1 includes an input management section 201, a display management section 202, a document management section 203, a plurality of document analysis modules 204a to 204c, and an image generation section 208, as software modules. Each of the document analysis modules 204a to 204c includes a document analysis section 205 (generation unit), a logical page extraction section 206 (extraction unit), and a reference logical page-determining section 207 (decision unit). The document analysis modules are associated with a plurality of respective formats (e.g. PDF, XPS, etc.) of document data items, and each analyze a document data item according to an associated one of the formats.

The input management section 201 manages user inputs received by the input section 104 appearing in FIG. 1. The display management section 202 manages a user interface and a preview image displayed on the display section 105. The document management section 203 controls a series of processes performed by the document analysis modules 204a to 204c, for analyzing document data stored in the storage section 103 appearing in FIG. 1, according to settings configured by the input management section 201.

The document analysis modules 204a to 204c are provided for respective formats of document data items. Although in the illustrated example, the three document analysis modules 204a to 204c are arranged, actually, document analysis modules are provided in a number corresponding to the number of formats of document data items. The image generation section 208 generates images according to document data based on results of analysis of the document data by the document analysis section 205.

Note that document data or data has physical pages to each of which a page number is sequentially assigned. Further, the document data has logical pages which form each associated document section, such as a table of contents or the main body, of the document data, and to each of which a page number is sequentially assigned.

Here, a description will be given of a preview process of PDF (portable document format) document data (also referred to as "PDF data") and an XPS (XML paper specification) document data (also referred to as "XPS data"), which are generally well known as document data.

FIGS. 3A and 3B illustrate examples of PDF document data stored in the printing apparatus shown in FIG. 1. FIG. 3A illustrates an example of the PDF document data, and FIG. 3B illustrates a binary representation (in hexadecimal) of the PDF document data.

Figure 19:
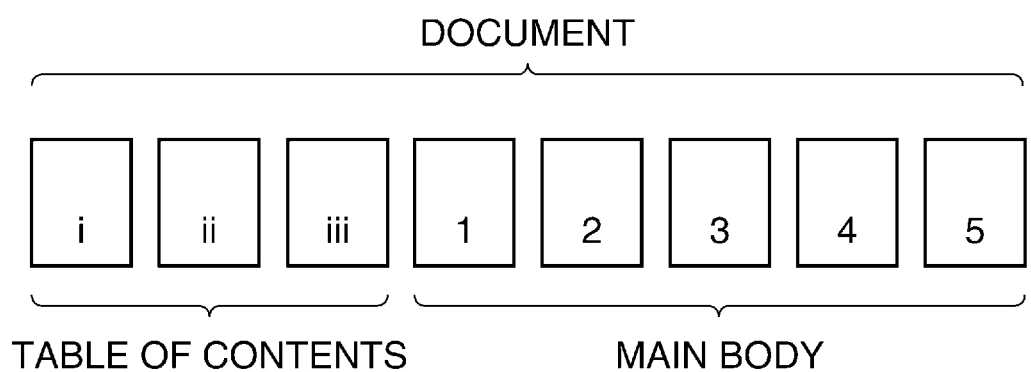
FIG. 19 is a diagram illustrating an example of the document data in which logical pages are different from physical pages.

The PDF document data "Sample.pdf" illustrated in FIG. 3A represents a PDF representation of the document illustrated in FIG. 19. The PDF document data "Sample.pdf" is in the form of a file denoted by reference numeral 401. Binary representation (in hexadecimal) of the leading 4 bytes, as specified in the PDF format, of the PDF document data "Sample.pdf" is shown in FIG. 3B.

FIGS. 4A and 4B illustrate examples of XPS document data stored in the printing apparatus shown in FIG. 1. FIG. 4A illustrates an example of the XPS document data, and FIG. 4B illustrates a binary representation (in hexadecimal) of the XPS document data.

In FIG. 4A, the illustrated XPS document data "Sample.xps" is an XPS representation of the document illustrated in FIG. 19. The XPS document data "Sample.xps" is in the form of a file denoted by reference numeral 501. Binary representation (in hexadecimal) of the leading 4 bytes, as specified in the XPF format, of the XPS document data "Sample.xps" is shown in FIG. 4B.

FIG. 5 is a flowchart of a preview process performed by the printing apparatus shown in FIG. 1. Note that the preview process is executed by associated software modules operating on the CPU 101.

Referring to FIGS. 1, 2 and 5, when a preview instruction is input from the input section 104 by the user, as mentioned above, the input management section 201 accepts the preview instruction. This preview instruction includes at least a document name (file name) of document data to be previewed.

When the preview instruction is accepted, the document management section 203 determines a format of document data to be previewed (step S601). In the present embodiment, the document management section 203 checks the format of the document data based on an extension (file name extension) associated with the document name and the leading 4 bytes of document data, to thereby determine a type of the document data.

For example, if the extension of the document data is "pdf", and at the same time the leading 4 bytes of the document data are "25 50 44 46", the document management section 203 determines that the document data to be previewed is PDF document data. On the other hand, if the extension of the document data is "xps", and at the same time the leading 4 bytes of the document data are "50 4B 03 04", the document management section 203 determines that the type of the document data to be previewed is XPS document data.

Next, the document management section 203 determines, according to a result of the document type determination, whether or not the document data to be previewed is PDF document data (step S602). If it is determined that the document data to be previewed is PDF document data (YES to the step S602), the document management section 203 analyzes the PDF document data, extracts logical pages therefrom, and determines reference logical pages, as described hereinafter, by using the document analysis module 204a associated with the PDF document data (step S603). The document management section 203 causes the image generation section 208 to generate an image based on results of analysis of the PDF document by the document analysis module 204a, and causes the image to be displayed as a preview image on the display section 105 (step S604), as described hereinafter, followed by terminating the preview process.

On the other hand, if it is determined that the document data to be previewed is not PDF document data (NO to the step S602), the document management section 203 determines whether or not the document data to be previewed is XPS document data (step S605). If it is determined that the document data to be previewed is XPS document data (YES to the step S605), the document management section 203 analyzes the XPS document data, extracts logical pages therefrom, and determines reference logical pages, as described hereinafter, by using the document analysis module 204b associated with XPS document data (step S606). Then, the document management section 203 proceeds to the step S604 to display a preview image on the display section 105.

If it is determined that the document data to be previewed is not XPS document data (NO to the step S605), the document management section 203 determines that the document data is not supported, followed by terminating the preview process.

Note that although in the flowchart shown in FIG. 5, the description has been given only of the preview process of PDF document data and XPS document data, it is possible to similarly perform preview processes on document data in other formats. In this case, it is only required to provide the printing apparatus with document analysis modules associated with the document data in the other formats. Further, although in FIG. 2, there are shown three document analysis modules, in the present example, the description has been given assuming that the printing apparatus is provided with only the document analysis modules 204a and 204b associated with PDF and XPS document data.

Figure 6:
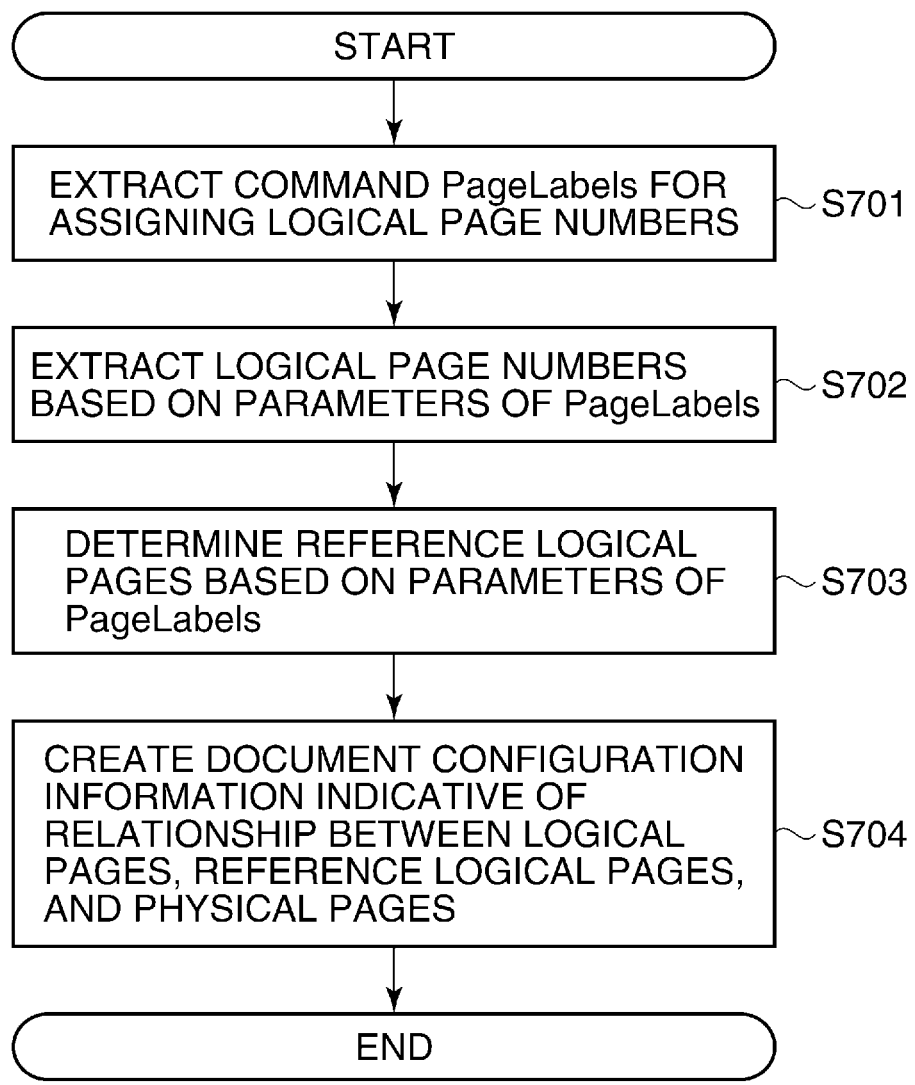
FIG. 6 is a flowchart of a PDF document analysis process performed by a document analysis module, appearing in FIG. 2, which is compatible with PDF documents.

FIG. 6 is a flowchart of a PDF document analysis process performed by the document analysis module 204a, appearing in FIG. 2, which is compatible with PDF documents.

Referring to FIGS. 2, 3A, 3B and 6, in the document analysis module 204a, the document analysis section 205 extracts a command for assigning a logical page number to each page while analyzing the PDF document data "Sample.pdf" (step S701). Specifically, the document analysis section 205 extracts a command of "PageLabels" specified in the PDF format.

Then, the logical page extraction section 206 extracts logical pages of the document data based on parameters following the command "PageLabels" (step S702). Specifically, in the case of the PDF document data "Sample.pdf" shown in FIGS. 4A and 4B, the logical page extraction section 206 extracts logical page numbers based on parameters <</Nums[0<</S/r>> 3<</S/D>>]. The parameters <</Nums[0<</S/r>> 3<</S/D>>] indicate how page numbers are assigned. The parameters correspond to logical page information.

More specifically, the parameters <</Nums[0<</S/r>> 3<</S/D>>] indicate that a parameter "r" (small letter Roman numerals) is sequentially assigned to physical pages starting from "0" (indicative of a first page of the physical pages), and a parameter "D" (Arabic numerals) is sequentially assigned to physical pages starting from "3" (indicative of a fourth page of the physical pages), and hence the logical page extraction section 206 extracts page numbers "i" to "iii" and "1" to "5" as respective groups of logical page numbers, based on the parameters <</Nums[0<</S/r>> 3<</S/D>>].

Next, the reference logical page-determining section 207 determines reference logical pages of the document based on the parameters following the command "PageLabels" (step S703). In the case of the PDF document data "Sample.pdf" shown in FIGS. 4A and 4B, a logical page "i" to which a first small letter Roman numeral is assigned by the parameter "r", and a logical page "1" to which a first Arabic numeral is assigned by the parameter "D" become the reference logical pages.

Then, the document analysis section 205 creates document configuration information (data configuration information) indicative of the relationship between the logical pages, the reference logical pages, and the physical pages, based on the above-mentioned command "PageLabels", logical pages, and reference logical pages (step S704), followed by terminating the PDF document analysis process by the document analysis module 204a.

Figure 7:
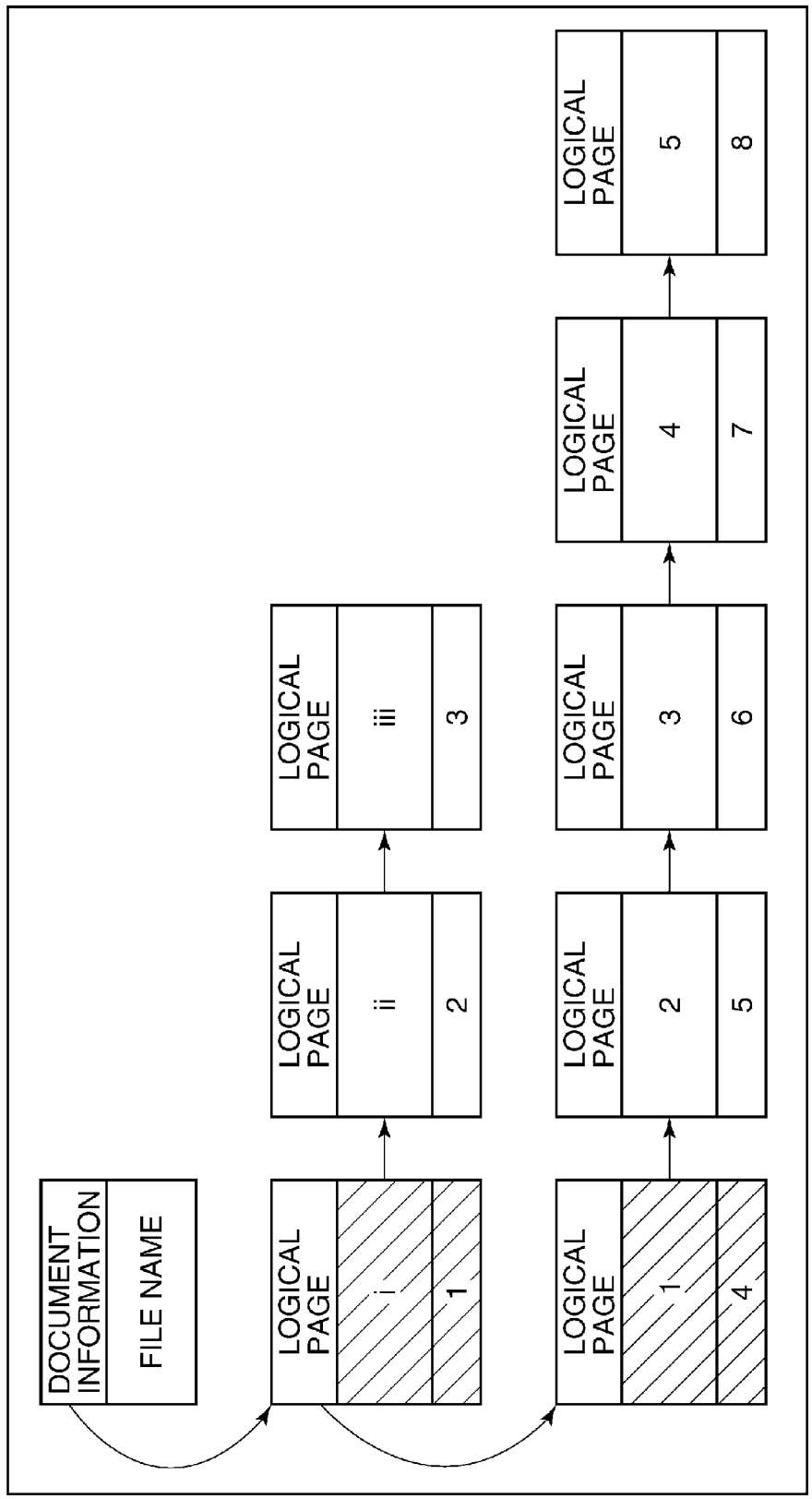
FIG. 7 is a diagram showing an example of document configuration information generated based on the document data shown in FIG. 4A.

FIG. 7 illustrates an example of the document configuration information generated based on the document data "Sample.pdf" shown in FIG. 4A.

The document configuration information has document information including the information of the file name (Sample.pdf). A sequence of logical pages is defined in association with the document information. Information on each logical page includes a physical page number corresponding to a logical page number. In FIG. 7, hatched blocks indicate the reference logical pages.

According to the document configuration information, the logical pages of the "table of contents" are sequentially arranged in a manner continued from the reference logical page of the "table of contents", and the logical pages of the "main body" are sequentially arranged in a manner continued from the reference logical page of the "main body". The document information is linked to the reference logical page of the "table of contents", and the reference logical page of the "table of contents" is linked to the reference logical page of the "main body".

As described above, the document configuration information describes the configuration of a document in which the consecutive logical pages following each associated reference logical page are sequentially connected. Note that in the illustrated example, each of the "table of contents" and the "main body" is a document section.

Therefore, it is possible to proceed to the reference logical pages sequentially from the document information and proceed to the logical pages following each reference logical page sequentially from the reference logical page.

Figure 8:
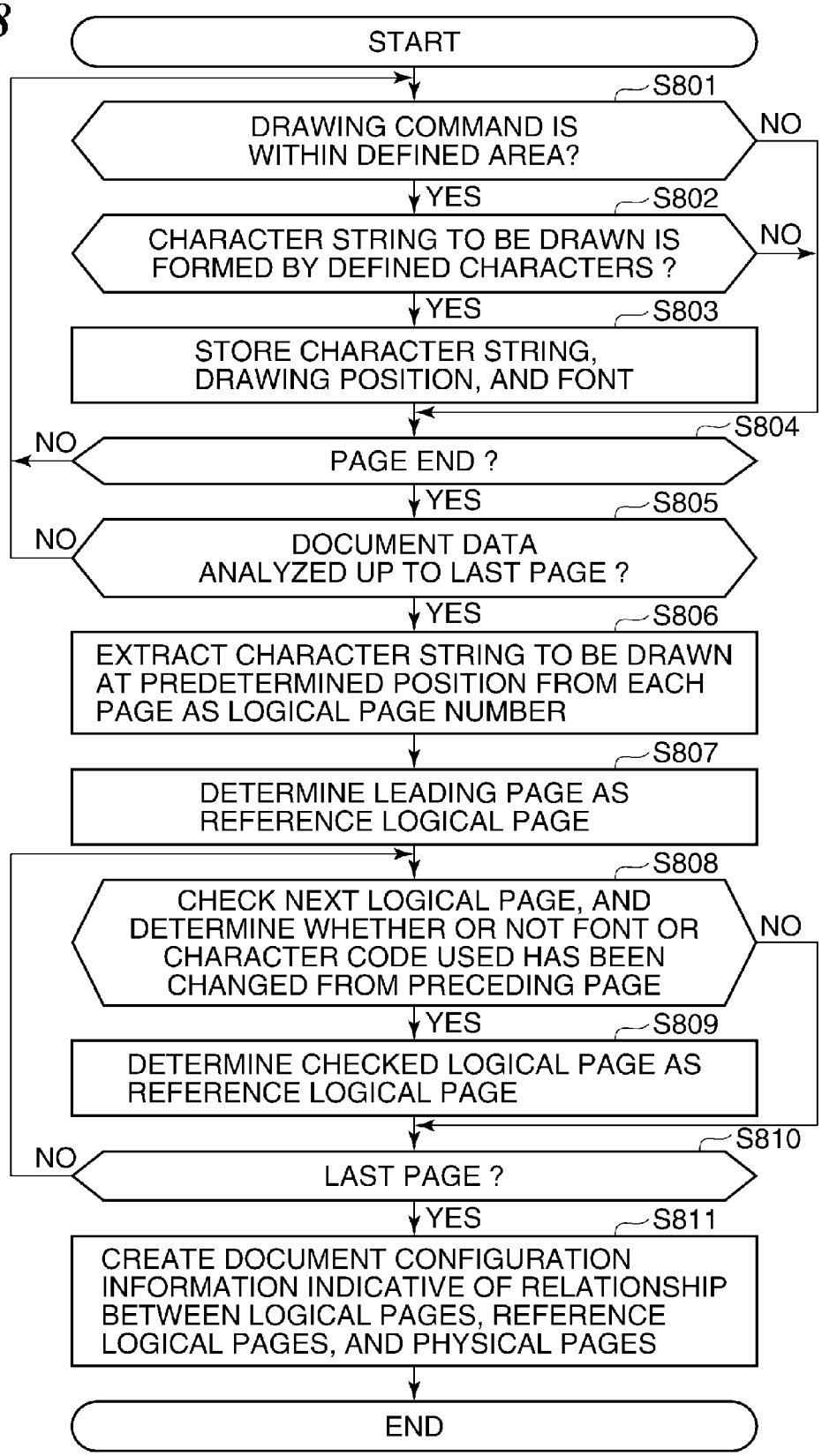
FIG. 8 is a flowchart of an XPS document analysis process performed by a document analysis module, appearing in FIG. 2, which is compatible with XPS documents.

FIG. 8 is a flowchart of an XPS document analysis process performed by the document analysis module 204b, appearing in FIG. 2, which is compatible with XPS documents.

Referring to FIGS. 2, 3A, 3B and 8, in the document analysis module 204b, the document analysis section 205 analyzes the XPS document data "Sample.xps" and determines whether or not the drawing position (x coordinate, y coordinate) of a drawing command is within a defined area (step S801). The above-mentioned defined area is set in the document analysis section 205 in advance by the document management section 203. In the illustrated example, an area defined by 0<x coordinate<1000 and 0<y coordinate<100, which has a high possibility of having a page number allocated thereto, is set as the defined area.

If it is determined that the drawing position is within the defined area (YES to the step S801), the document analysis section 205 determines whether or not a character string to be drawn is formed by defined characters (step S802). The above-mentioned defined characters are set in advance in the document management section 203. In the illustrated example, it is assumed that the defined characters are alphabetical capital letters (ASCII codes 0x41 to 0x5A), alphabetical small letters (ASCII codes 0x61 to 0x7A), and numeric characters (ASCII codes 0x30 to 0x39). Note that the term "character string" includes a character string formed by a single character.

If it is determined that the character string to be drawn is formed by defined characters (YES to the step S802), the document analysis section 205 stores the character string, the drawing position where the character string is to be drawn, and a font used for the character string, as character string information (step S803).

FIG. 9 illustrates an example of the character string information stored by the document analysis section 205 appearing in FIG. 2. In FIG. 9, the character string information includes items of character string, ASCII code, x coordinate, y coordinate, and font.

Then, the document analysis section 205 determines whether or not the analysis has reached the page end (step S804). If it is determined that the analysis has not reached the page end (NO to the step S804), the document analysis section 205 returns to the step S801 to continue the analysis of the page.

Note that if it is determined in the step S801 that the drawing position is not within the defined area (NO to the step S801), the document analysis section 205 proceeds to the step S804. Similarly, if it is determined in the step S802 that the character string to be drawn is not formed by defined characters (NO to the step S802), the document analysis section 205 proceeds to the step S804.

If it is determined that the analysis has reached the page end (YES to the step S804), the document analysis section 205 determines whether or not the analysis has been made up to the last page (step S805). If it is determined that the analysis has not been made up to the last page (NO to the step S805), the document analysis section 205 returns to the step S801 to analyze a next page.

If it is determined that the analysis has been made up to the last page (YES to the step S805), the logical page extraction section 206 extracts logical pages of the XPS document data "Sample.xps" according to the character string information illustrated in FIG. 9 (step S806). Specifically, the logical page extraction section 206 extracts a character string to be drawn at a predetermined position, from each page of the XPS document data, as a logical page number. That is, the logical page extraction section 206 extracts the character strings "i" to "iii" and "1" to "5" appearing at the same drawing position (x coordinate, y coordinate) on the respective pages as page numbers of logical pages, based on the character string information illustrated in FIG. 9.

Next, the reference logical page-determining section 207 determines the leading page of the XPS document data as a reference logical page (step S807). Further, the reference logical page-determining section 207 checks a next logical page to determine whether or not a font or a character code used has been changed from one in the preceding page (step S808).

For example, in FIG. 9, the alphabetical small letters (ASCII codes 0x61 to 0x7A) are continuously used for character strings in the physical pages 1, 2, and 3. On the other hand, in the physical page 4, the numeric characters (ASCII codes 0x30 to 0x39) are used as character strings. In this case, the reference logical page-determining section 207 determines that a change has occurred in the character code.

If it is determined that a change has occurred in the font or the character code used in the preceding page (YES to the step S808), the reference logical page-determining section 207 determines the logical page on which the font or the character code has been changed as a reference logical page (step S809).

Then, the reference logical page-determining section 207 determines whether or not the check for determining a reference logical page has been performed up to the last page (step S810). If it is determined that the checking has been performed up to the last page (YES to the step S810), the document analysis section 205 creates document configuration information indicative of the relationship between the above-mentioned physical pages, logical pages, and reference logical pages (step S811), followed by terminating the document analysis process.

On the other hand, if it is determined that the check for determining a reference logical page has not been performed up to the last page (NO to the step S810), the reference logical page-determining section 207 returns to the step S808 to continue the checking.

Note that if it is determined in the step S808 that no change has occurred in the font or the character code used in the preceding page (NO to the step S808), the reference logical page-determining section 207 proceeds to the step S810.

In the example illustrated in FIG. 9, in the step S806, the character strings "i" to "iii" and "1" to "5" are determined as page numbers of logical pages, and in the step S807, the character string "i" is determined as a page number of a reference logical page. Further, in the step S809, the character string "1" is determined as a page number of a reference logical page. The document configuration information generated based on the XPS document data is the same as the document configuration information shown in FIG. 7.

Figure 10A:
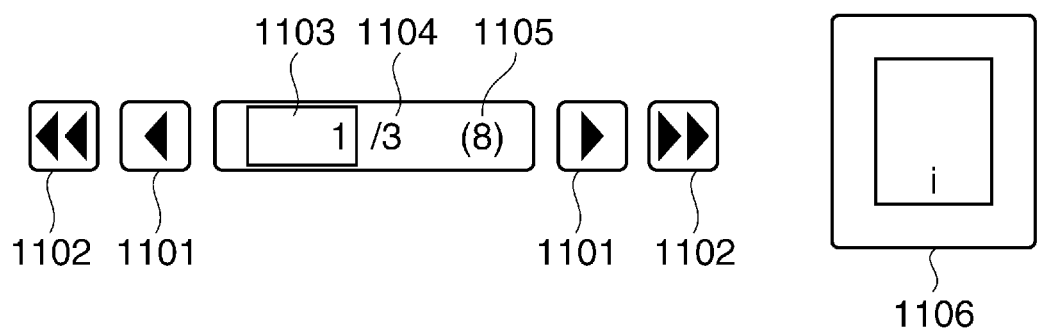
Figure 10B:
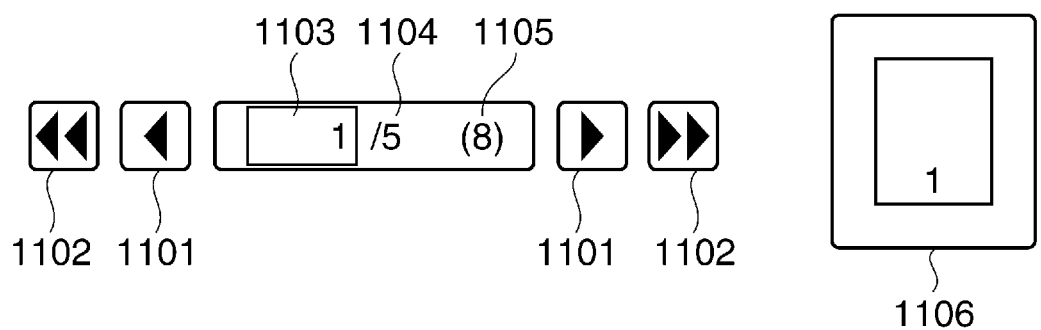

FIGS. 10A and 10B are views useful in explaining a preview display performed by the document management section 203 appearing in FIG. 2, in which FIG. 10A illustrates a state of an initial user interface displayed when the PDF document data or the XPS document data is previewed, and FIG. 10B illustrates a state of a user interface displayed when a next reference logical page is previewed. Note that in the illustrated example, the preview display is performed on the document data shown in FIG. 19.

First, the display section 105 displays the user interface shown in FIG. 10A. This user interface displays buttons 1101 and 1102. The button 1101 is for previewing preceding logical pages or following logical pages one by one. The button 1102 is for previewing a preceding reference logical page or a following reference logical page.

The user interface shown in FIG. 10A displays a window 1103 to which a relative page number counted from a reference logical page is input, and a logical page designated by the window 1103 is displayed for preview. Further, the user interface displays a total number 1104 of logical pages including one being previewed and associated with the reference logical page, and further displays a total number 1105 of the physical pages of the document data. Further, the user interface displays an image 1106 of the logical page being previewed.

If a right-side one of the buttons 1102 is depressed on the user interface shown in FIG. 10A for preview of a next reference logical page, the user interface is changed into a state illustrated in FIG. 10B. In this case, the document management section 203 can easily refer to the next reference logical page from the leading reference logical page using the document configuration information shown in FIG. 7, and displays an image 1106 of the reference logical page which corresponds to a fourth page of the physical pages.

As described above, in the first embodiment, in previewing document data, the user can designate a reference logical page and a logical page, and easily preview a preceding or following reference logical page. This makes it possible to enhance operability when the user previews document data.

Next, a description will be given of a printing apparatus, which is an example of an information processing apparatus according to a second embodiment of the present invention. Note that the hardware configuration and the software configuration of the printing apparatus as the information processing apparatus according to the second embodiment are the same as those shown in FIGS. 1 and 2.

Although in the first embodiment, the description has been given, by way of example, of a case where PDF document data and XPS document data are previewed, in the second embodiment, a description will be given of a case where PDL (page description language) data is previewed in addition to PDF document data and XPS document data.

The PDL data can define not only a page layout where two pages are arranged on a single sheet (this page layout is referred to as "2in1") but also a page layout where four pages are arranged on a sheet (this page layout is referred to as "4in1"). Therefore, the PDL data sometimes has a plurality of pages on a single physical page. As described above, also in the PDL data, logical pages are different from physical pages.

Figure 11:
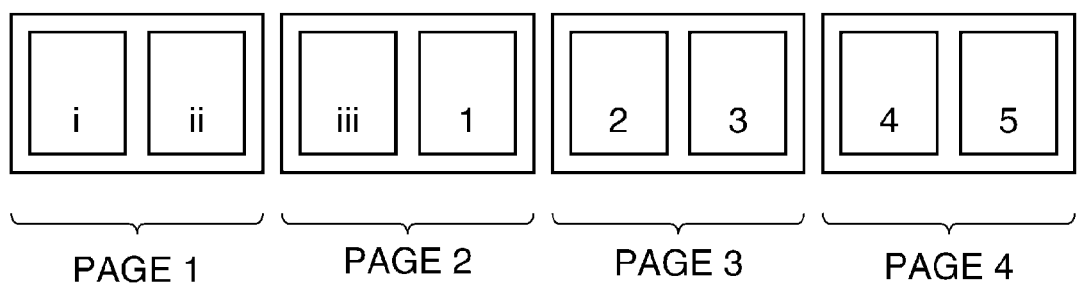
FIG. 11 is a view illustrating an example of PDL data in which two pages are arranged on a sheet (2in1).

FIG. 11 illustrates an example of PDL data in which two pages are arranged on a sheet (2in1).

In FIG. 11, Roman numerals represent page numbers of a table of contents, and Arabic numerals represent page numbers of a main body. In the illustrated example, since two pages are arranged on one sheet, there are arranged eight logical pages in four physical pages.

Figures 12A, 12B:
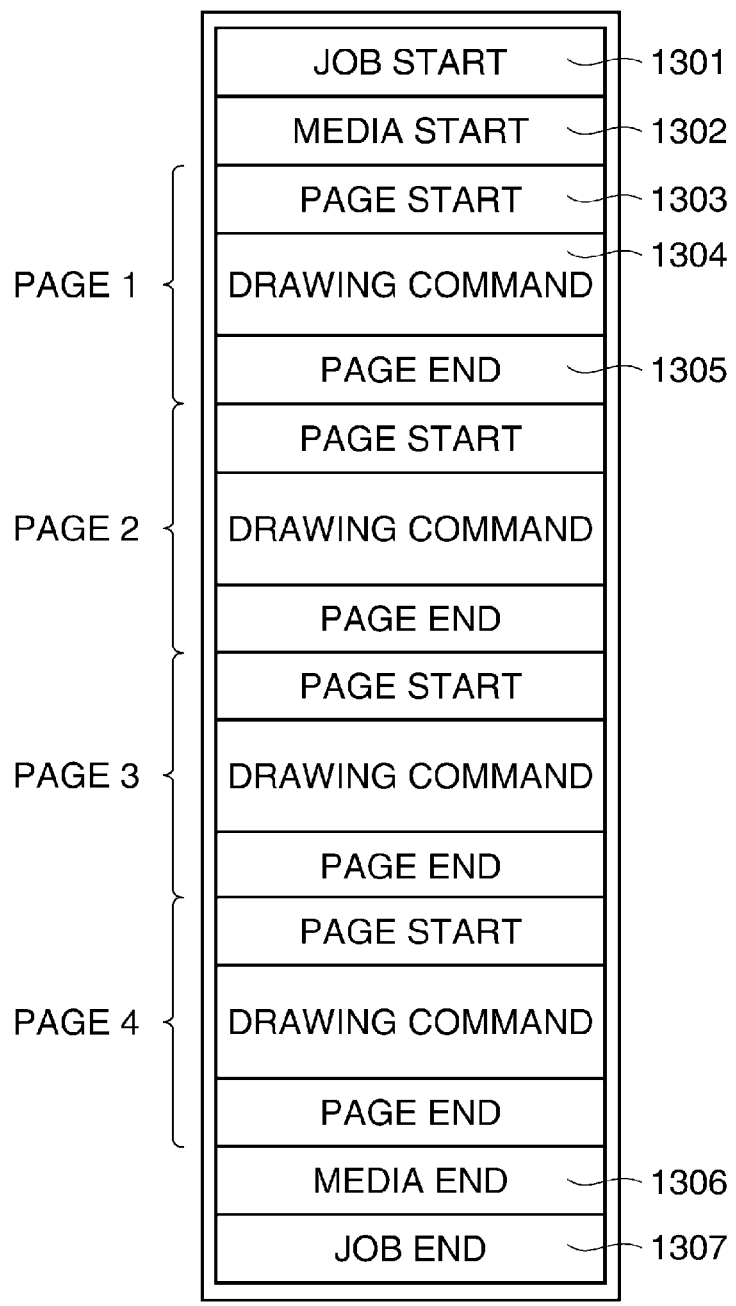

FIGS. 12A and 12B are diagrams useful in explaining the data structure of the PDL data illustrated in FIG. 11, in which FIG. 12A illustrates the data structure of the PDL data, and FIG. 12B illustrates a binary representation (in hexadecimal) of leading 4 bytes of the PDL data.

As shown in FIG. 12A, the PDL data includes a job start command (job start) 1301 and a media start command (media start) 1302 arranged in the mentioned order, from the leading end of the PDL data. Page (physical page) 1 to page 4 are arranged following the media start command 1302, and a media end command (media end) 1306 and a job end command (job end) 1307 follow the page 4.

Each of page 1 to page 4 includes a page start command (page start) 1303, a drawing command 1304, and a page end command (page end) 1305.

The job start command 1301 includes layout information indicating that logical pages are arranged in 2in1 on each physical page. The job start command 1301 is paired with the job end command 1307, and the layout information included in the job start command 1301 is effective until a next job end command 1307.

The media start command 1302 includes sheet information indicative of a type of printing sheets. The media start command 1302 is paired with the media end command 1306, and the sheet information included in the media start command 1302 is effective until a next media end command 1306.

The page start command 1303 indicates the start of a physical page, and is paired with the page end command 1305. The drawing command 1304 indicates a command for drawing areas within the physical page as desired, and is categorized into respective types for performing image drawing, graphic drawing, and character drawing. The binary representation (in hexadecimal) of the leading 4 bytes of the PDL data shown in FIG. 12A is illustrated in FIG. 12B.

Figure 13:
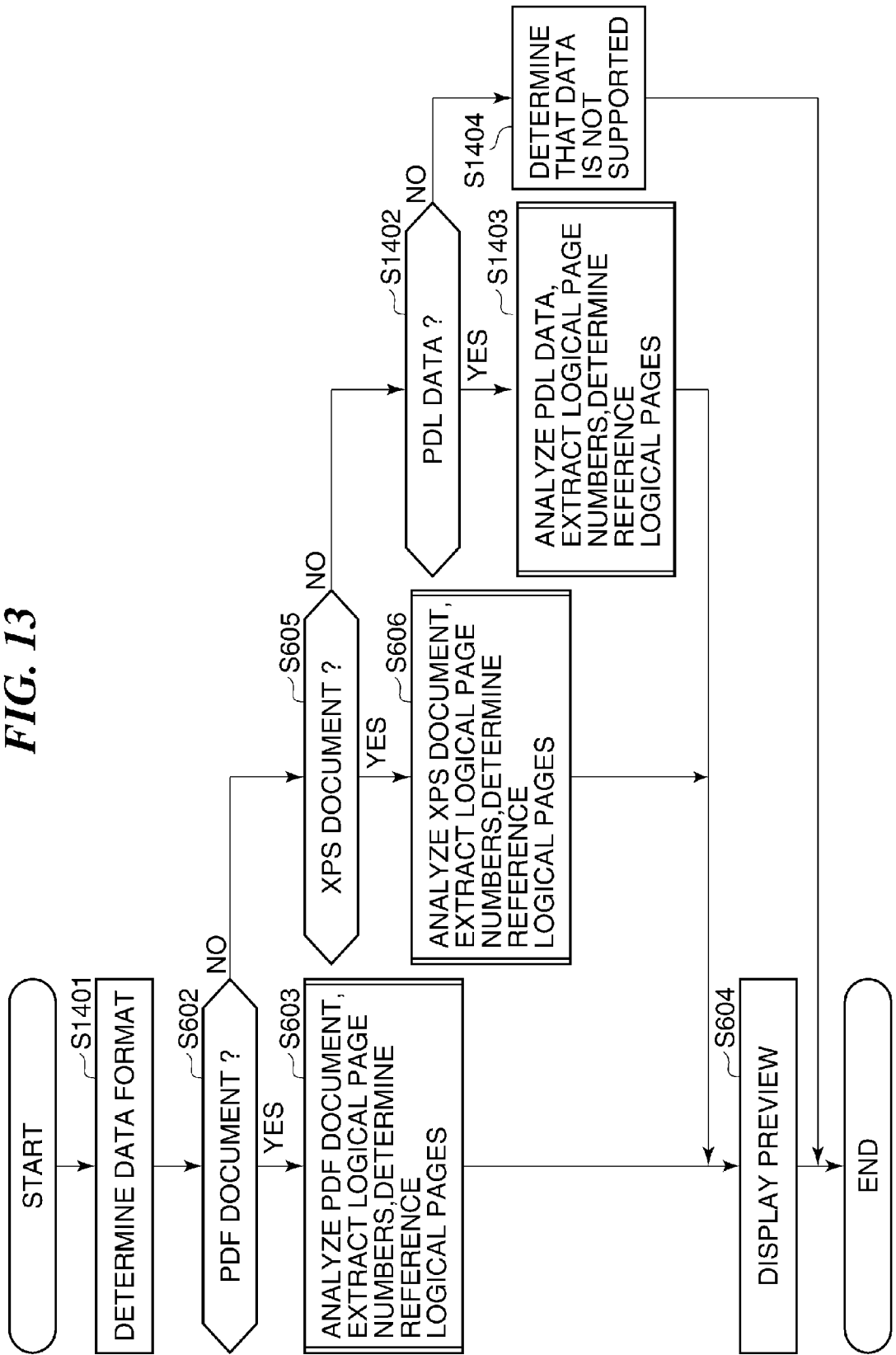
FIG. 13 is a flowchart of a preview process performed by a printing apparatus as an information processing apparatus according to a second embodiment of the present invention.

FIG. 13 is a flowchart of a preview process performed by the printing apparatus as the information processing apparatus according to the second embodiment of the present invention. Note that in FIG. 13, the same steps as those in the FIG. 5 flowchart are denoted by the step numbers.

Referring to FIGS. 1, 2, and 5, when a preview instruction is input from the input section 104 by the user, as described above, the input management section 201 accepts the preview instruction. This preview instruction includes at least a document name or a data name to be previewed.

When the preview instruction is accepted, the document management section 203 determines the format of document data to be previewed (step S1401). In the present embodiment, the document management section 203 checks the format of the document data based on an extension associated with the document name or the data name and the leading 4 bytes of the document data. In this step, if the extension of the document data is "prn", and at the same time the leading 4 bytes of the document data are "AB CD AB CD" as shown in FIG. 12B, the document management section 203 determines that the document data to be previewed is PDL document data. Note that PDF document data and XPS document data are determined as described with reference to FIG. 5.

In the step S602, if it is determined that the document data to be previewed is PDF document data, the document management section 203 extracts logical page numbers therefrom, and determines reference logical pages, as described with reference to FIGS. 5 and 6 (step S603). Then, the document management section 203 displays a preview image generated based on results of analysis of the PDF document on the display section 105 (step S604), followed by terminating the preview process.

If it is determined in the step S602 that the document data to be previewed is not PDF document data, the document management section 203 determines whether or not the document data to be previewed is XPS document data (step S605). If it is determined in the step S605 that the document data to be previewed is XPS document data, the document management section 203 extracts logical page numbers and determines reference logical pages, as described with reference to FIGS. 5 and 8 (step S606). Then, the document management section 203 displays a preview image generated based on results of analysis of the XPS document on the display section 105 (step S604), followed by terminating the preview process.

If it is determined in the step S605 that the document data to be previewed is not XPS document data (NO to the step S605), the document management section 203 determines whether or not the document data to be previewed is PDL data (step S1402).

If it is determined that the document data to be previewed is PDL data (YES to the step S1402), the document management section 203 analyzes the PDL data, extracts logical page numbers therefrom, and determines reference logical pages, as described hereinafter, by using the document analysis module 204c compatible with the PDL data (step S1403). Then, the document management section 203 proceeds to the step S604 to display a preview image on the display section 105.

If it is determined that the document data to be previewed is not PDL document data (NO to the step S1402), the document management section 203 determines that the document data is not supported (step S1404), followed by terminating the preview process.

Note that in the PDL data, the logical pages are expressed by a drawing command, similarly to the XPS document data, and therefore a basic analysis process for analyzing the PDL data is the same as the process for analyzing the XPS document data. The process for analyzing the PDL data is distinguished from the process for analyzing the XPS document data in a method of determining a drawing area in the step S801 in FIG. 8.

Figure 14:
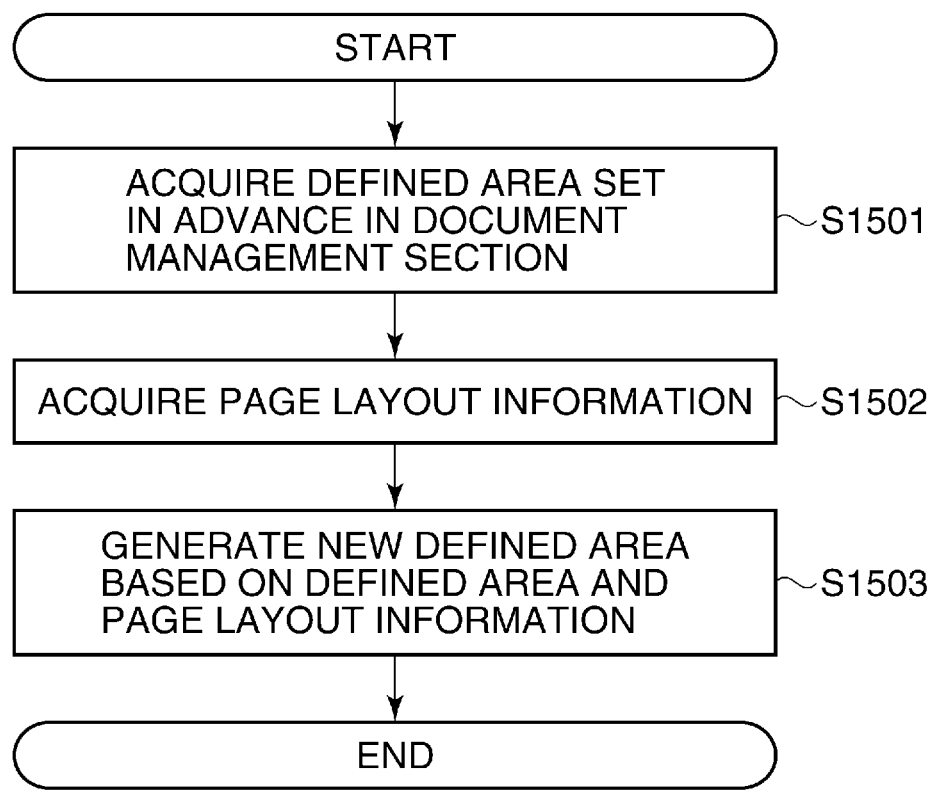
FIG. 14 is a flowchart of a process for generating defined areas, which is performed by the printing apparatus.

Although in the case of the XPS document data, the drawing area is determined using a defined area set in the document management section 203 in advance, in the case of the PDL data, a plurality of pages can be originally arranged on one physical page, and hence defined areas are newly determined in the following manner:

FIG. 14 is a flowchart of a process for generating the defined areas in the printing apparatus as the image processing apparatus according to the second embodiment.

Referring to FIGS. 1, 2, and 14, in the document analysis module 204c, the document analysis section 205 acquires a defined area set in the document management section 203 in advance (step S1501). Then, the document analysis section 205 acquires page layout information from the job start command 1301 of the PDL data (step S1502). In the present example, 2in1 is acquired as the layout information.

Next, the document analysis section 205 generates new defined areas based on the defined area and the layout information (step S1503), followed by terminating the process for generating the defined area.

Figure 15A:
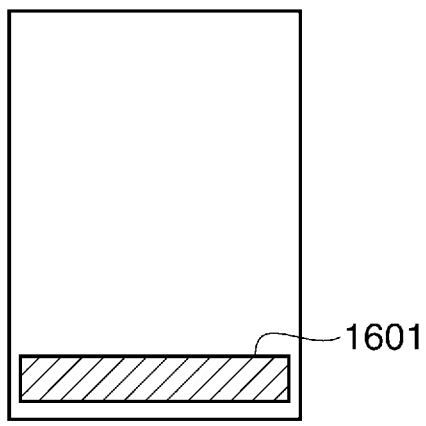
FIGS. 15A and 15B are views illustrating respective examples of a defined area acquired by the document analysis section from the document management section and defined areas newly generated by the document analysis section.
Figure 15B:
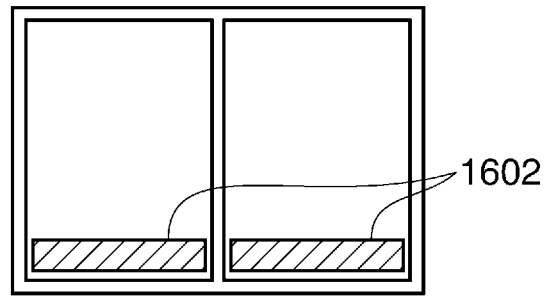

FIGS. 15A and 15B are views illustrating respective examples of the defined area 1601 acquired from the document management section 203 by the document analysis section 205 appearing in FIG. 2 and the new defined areas 1602 generated by the document analysis section 205.

As described hereinabove, since the document analysis section 205 has acquired 2in1 as the layout information, the document analysis section 205 positions the defined area 1601 acquired from the document management section 203 in two pages according to the layout information, to thereby generate two defined areas 1602. Then, by using the newly generated defined areas 1602, the document analysis section 205 analyzes the PDL data, extracts logical page numbers therefrom, and determines reference logical pages, similarly to the process described with reference to FIG. 8.

Figure 16:
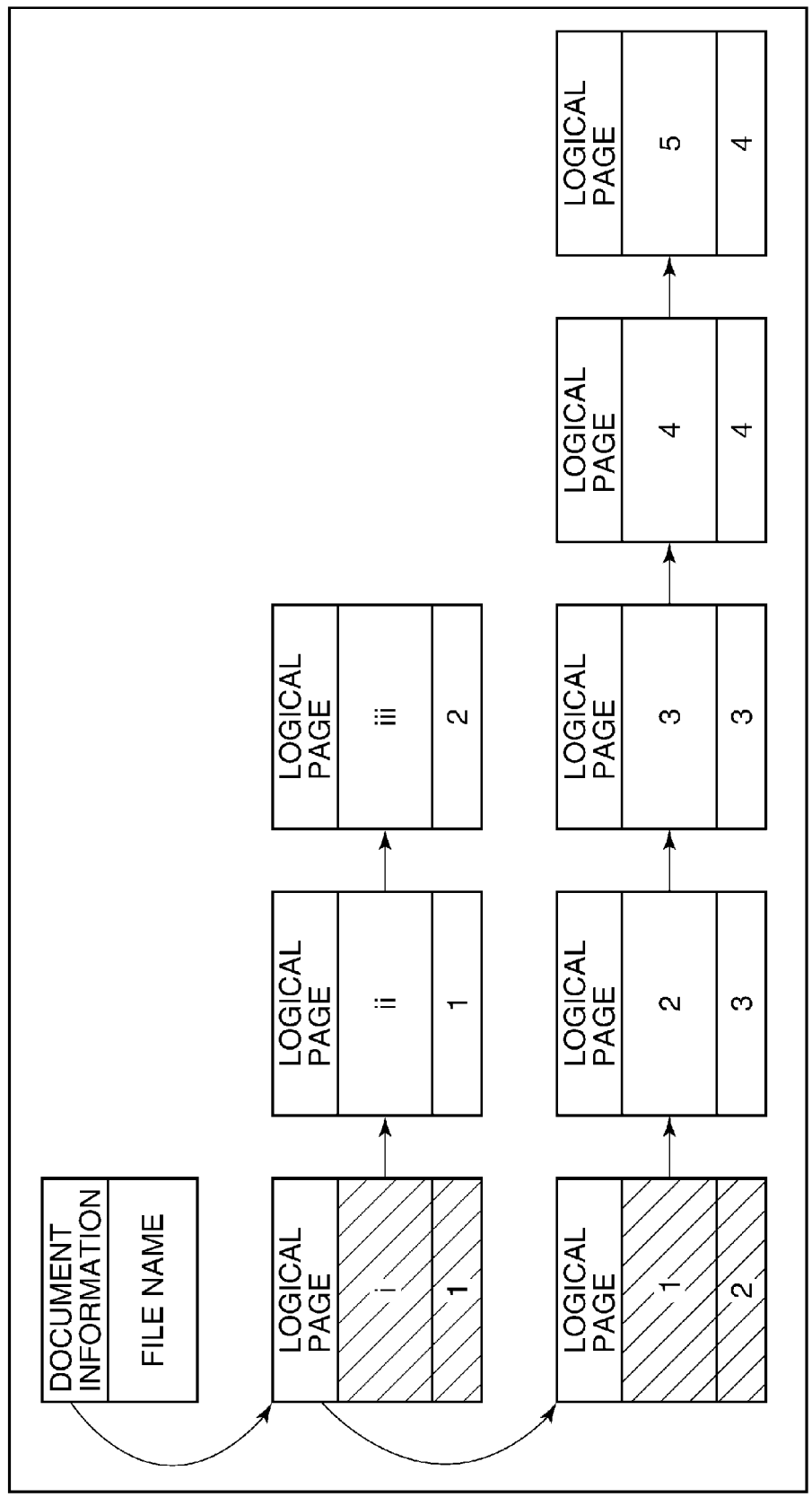
FIG. 16 is a diagram illustrating an example of document configuration information generated based on the PDL data shown in FIGS. 12A and 12B.

FIG. 16 illustrates an example of document configuration information generated based on the PDL data shown in FIGS. 12A and 12B.

In FIG. 16, the document configuration information has document information including the information of the file name. A sequence of logical pages is defined in association with the document information. Information on each logical page includes a physical page number corresponding to a logical page number. Hatched blocks indicate the reference logical pages.

In the illustrated example, since the layout information is 2in1, two logical pages form one physical page, and page iii of a table of contents forms a first half of physical page 2. Further, a first page of a main body forms a second half of physical page 2. According to the document configuration information, the logical pages of the "table of contents" are sequentially arranged in a manner continued from the reference logical page of the "table of contents", and the logical pages of the "main body" are sequentially arranged in a manner continued from the reference logical page of the "main body". The document information is linked to the reference logical page of the "table of contents", and the reference logical page of the "table of contents" is linked to the reference logical page of the "main body".

Therefore, it is possible to proceed to the reference logical pages sequentially from the document information and proceed to the logical pages following each associated reference logical page sequentially from the reference logical page.

As described above, according to the second embodiment, also when PDL data used for routine printing is previewed in addition to PDF document data and XPS document data, the user can designate a reference logical page and a logical page, and easily preview a preceding or following reference logical page. This makes it possible to further enhance the convenience of preview than in the first embodiment. For example, the present embodiment makes it possible to display document data in which a page layout, such as 2in1 or 4in1, is set, for preview, in an easily operable manner, by taking the relationship between logical pages and physical pages into account.

Next, a description will be given of a printing apparatus, which is an example of an information processing apparatus according to a third embodiment of the present invention. Note that the hardware configuration and the software configuration of the printing apparatus according to the third embodiment are the same as those shown in FIGS. 1 and 2.

It is assumed here that logical page numbers of document data have been extracted, as described in the step S702 in FIG. 6 and the step S806 in FIG. 8. In the third embodiment, reference logical pages are determined by a method different from the first and second embodiments.

Figure 17:
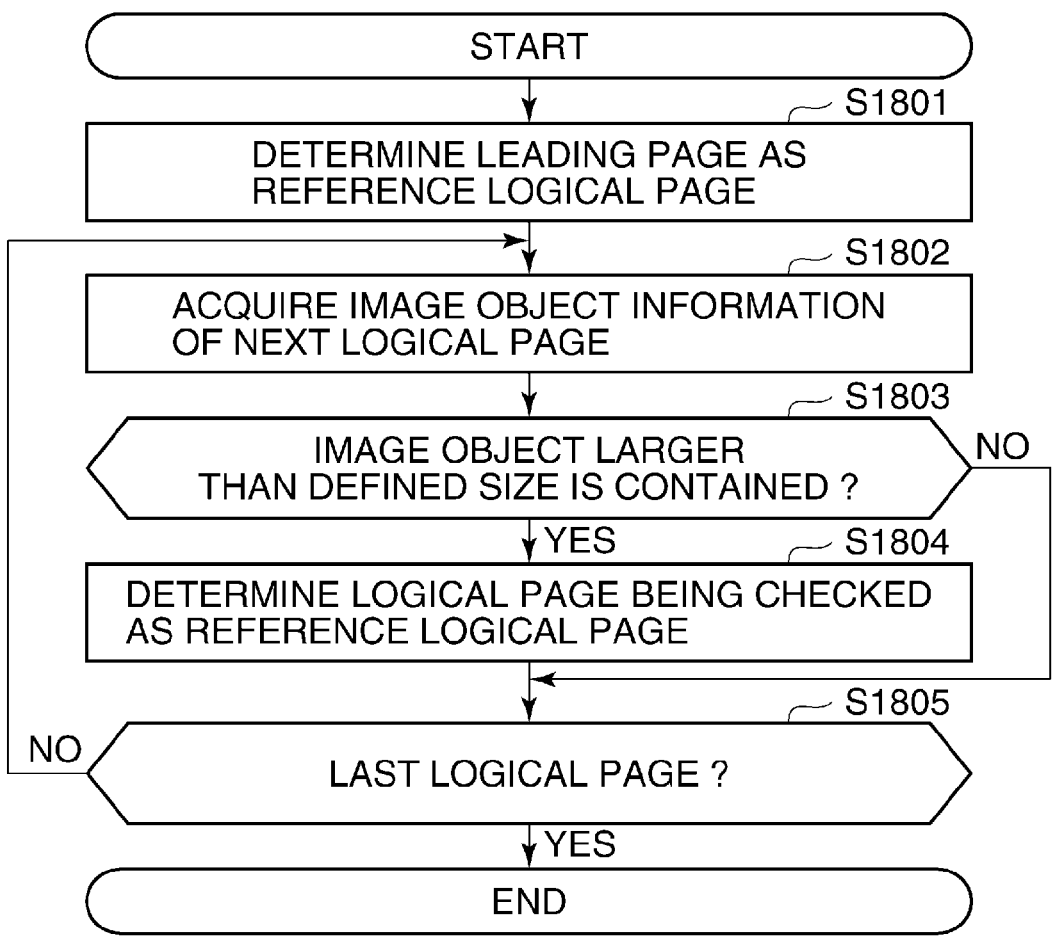
FIG. 17 is a flowchart of a process for determining a reference logical page, which is performed by a printing apparatus as an information processing apparatus according to a third embodiment of the present invention.

FIG. 17 is a flowchart of a process for determining a reference logical page in the printing apparatus as the information processing apparatus according to the third embodiment, which is executed e.g. when pages including large-sized image data are desired to be previewed.

Referring to FIGS. 1, 2, and 17, as described with reference to FIG. 8, the reference logical page-determining section 207 determines the leading page of the document data as a reference logical page after extracting the logical page numbers of the document data (step S1801). Then, the reference logical page-determining section 207 acquires image object information indicative of an image object contained in a next logical page based on results of analysis by the document analysis section 205 (step S1802).

The reference logical page-determining section 207 determines whether or not the next logical page contains an image object having a size larger than a defined size determined in advance (step S1803). It is assumed here that this defined size is set in advance in the document management section 203. If it is determined that the next logical page contains an image object having a size larger than the defined size (YES to the step S1803), the reference logical page-determining section 207 determines the next logical page being checked, as a reference logical page (step S1804).

Next, the document analysis section 205 determines whether or not the next logical page is a last logical page (step S1805). If it is determined that the next logical page is not the last logical page (NO to the step S1805), the reference logical page-determining section 207 returns to the step S1802. On the other hand, if it is determined that the next logical page is the last logical page (YES to the step S1805), the reference logical page-determining section 207 terminates the present process.

Note that in the step S1803, if it is determined that the next logical page does not contain an image object having a size larger than the defined size (NO to the step S1803), the process proceeds to the step S1805.

Figure 18:
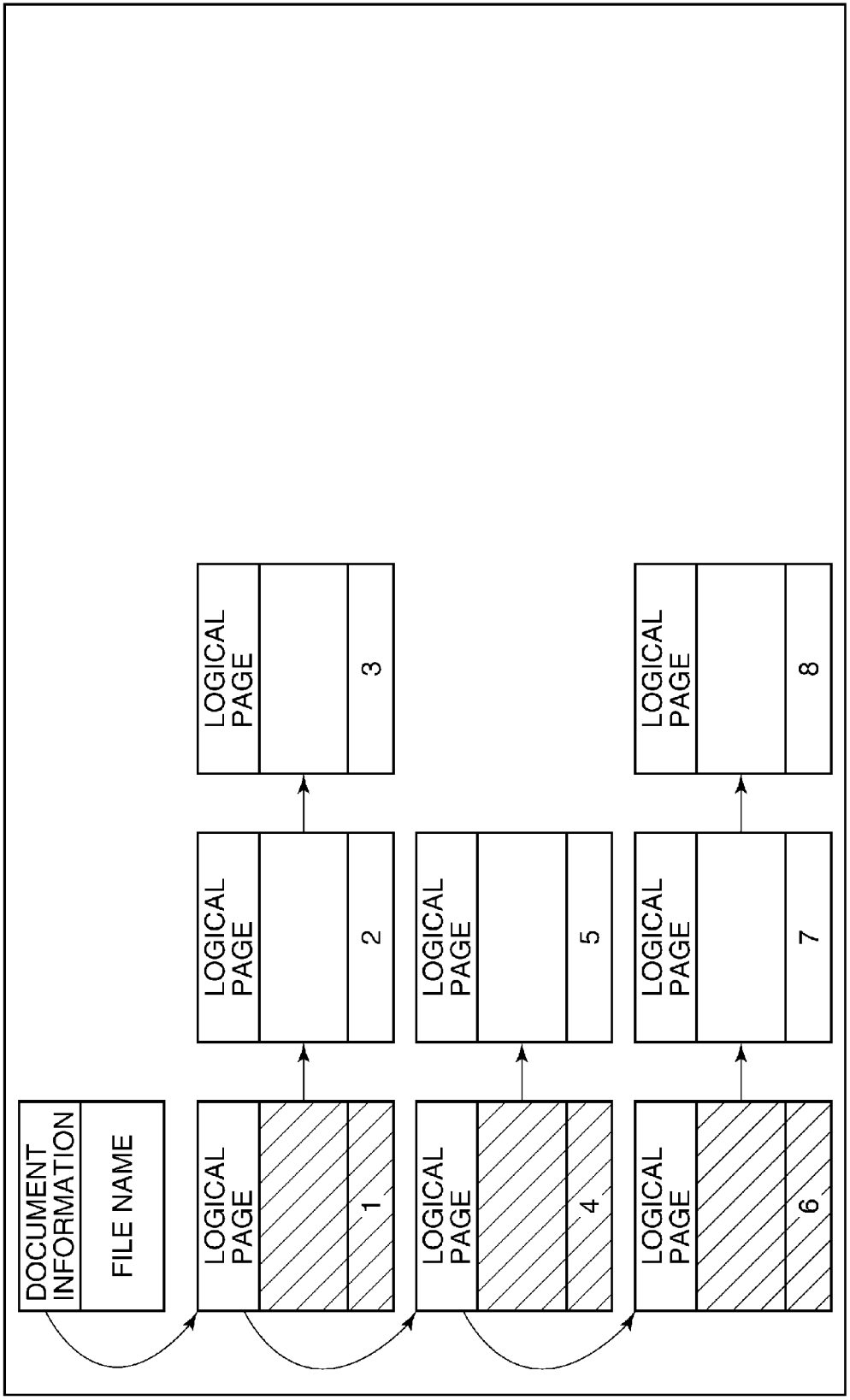
FIG. 18 is a diagram illustrating an example of document configuration information generated by the determining process shown in FIG. 17.

FIG. 18 illustrates an example of document configuration information generated by the determination process described with reference to FIG. 17.

The illustrated document configuration information has document information including the information of the file name. A sequence of logical pages is defined in association with the document information. Information on each logical page includes a physical page number corresponding to a logical page number. In FIG. 18, hatched blocks indicate the reference logical pages.

Here, the leading page of the document data is determined as a reference logical page, and logical pages each containing an image object having a size larger than the defined size are determined as reference logical pages. In the illustrated example, the document data has a structure in which first, fourth, and sixth physical pages are determined as reference logical pages, and logical pages follow each reference logical page.

The process described in the third embodiment can be employed not in normal preview but in a case where attention is desired to be paid only to pages of data, such as document data, each containing a very large image.

Note that although in the illustrated example, attention is paid to an image object having a size larger than the defined size, reference logical pages may be determined by paying attention to a character having a size larger than a defined size or an object having a defined color.

As described above, in the third embodiment, the user can check data, such as document data, by paying attention to a specific type of objects, which makes it possible to enhance preview functionality.

As described heretofore, in the embodiments of the present invention, the user can preview document data by designating a logical page and a reference logical page. This makes it possible to skip pages, such as pages of the "table of contents", to a page of the "main body" of the document data for immediate preview, thereby making it possible to enhance operability for preview by the user.

As is clear from the above description, in FIG. 2, the display management section 202, the document management section 203, and the image generation section 208 function as an example of a display control unit in the embodiments. Note that although in the above-described embodiments, the description has been given of the printing apparatus as an example of the image processing apparatus, the present invention can also be applied to any other apparatus, insofar as the apparatus has the function of displaying data for preview.

Further, the above-described processes described with reference to the illustrated flowcharts can be executed by the CPU executing programs stored in the storage section of the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Further, it is to be understood that the present invention may be a combination of any of the above-described embodiments as deemed appropriate.

For example, by configuring a control method such that steps thereof correspond to the functions of the present embodiment, the control method may be executed by an information processing apparatus. Further, a program having the functions of the above-described embodiment may be configured as a control program, and the control program may be executed by a computer included in the information processing apparatus. The control program is recorded e.g. in a computer-readable storage medium.

In such cases, the control method and the control program each include at least an extraction step, a determination step, a generation step, and a display control step.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-105087 filed May 10, 2011, which is hereby incorporated by reference herein in its entirety.

What is claimed is:

1. An information processing apparatus that stores data having a plurality of pages, comprising:
    a non-transitory memory device;
    a processor;
    a display device configured to display the data on a page-by-page basis according to a display instruction;
    an extraction unit configured to extract consecutive pages of each of document sections of the data, as logical pages, in association with physical page numbers each sequentially assigned to each at least one of the pages of the data;
    a decision unit configured to decide a leading logical page of each document section, as a reference logical page such that a first document section includes a first reference logical page sequentially connected to at least one first logical page and a second document section includes a second reference logical page sequentially connected to at least one second logical page, the first reference logical page being further sequentially connected to the second reference logical page; and
    an instruction unit configured to, in a first case, give the display instruction so as to cause the display device to consecutively display the first reference logical page and the second reference logical page one page at a time, and in a second case, give the display instruction so as to cause the display device to consecutively display the first reference logical page and the at least one first logical page one page at a time;
    wherein when the data is displayed by the display device, the display device simultaneously displays display information indicative of a total number of physical pages contained in the data, information indicative of a total number of logical pages of a document section including a page being displayed, and information indicative of a position of the page being displayed in a sequence of all of the logical pages; and
    wherein the extraction unit, the decision unit, and the instruction unit are implemented by the processor executing at least one program recorded on the non-transitory memory device.

2. The information processing apparatus according to claim 1, further comprising a determination unit configured to determine a type of the data according to a format of the data instructed by the display instruction; and
    wherein when the type determined by the determination unit is PDF data, the extraction unit extracts the logical pages based on logical page information indicative of logical page numbers of the respective document sections, defined in the PDF data; and
    wherein the decision unit decides the reference logical page according to the logical page information;
    wherein the determination unit is implemented by the processor executing at least one program recorded on the non-transitory memory device.

3. The information processing apparatus according to claim 1, further comprising a determination unit configured to determine a type of the data according to a format of the data instructed by the display instruction; and
    wherein when the type determined by the determination unit is XPS data, the extraction unit extracts the logical pages according to a drawing command defined in the XPS data,
    wherein the decision unit decides a leading page of the physical pages as a reference logical page, and when any logical page following the leading page is changed in at least a font or a character code, the decision unit judges that the logical page is a leading logical page of a document section, and decides the logical page as a reference logical page;
    wherein the determination unit is implemented by the processor executing at least one program recorded on the non-transitory memory device.

4. The information processing apparatus according to claim 1, further comprising a determination unit configured to determine a type of the data according to a format of the data instructed by the display instruction; and
    wherein when the type determined by the determination unit is PDL data in which a plurality of logical pages are arranged in one physical page, the extraction unit extracts the logical pages according to a drawing command defined in the PDL data and layout information indicative of arrangement of the logical pages, and wherein the decision unit decides a leading page of the physical pages as a reference logical page, and when any logical page following the leading page is changed in at least a font or a character code, the decision unit regards that the logical page is a leading logical page of a document section, and decides the logical page as a reference logical page;

wherein the determination unit is implemented by the processor executing at least one program recorded on the non-transitory memory device.

5. The information processing apparatus according to claim 1, wherein the decision unit decides a leading page of the physical pages as a reference logical page, and when an image object contained in any logical page following the leading page contains a specific object, the decision unit decides the logical page as a reference logical page.

6. The information processing apparatus according to claim 5, wherein the specific object is an image having a size larger than a defined size determined in advance.

7. The information processing apparatus according to claim 5, wherein the specific object is a character having a size larger than a defined size determined in advance.

8. The information processing apparatus according to claim 5, wherein the specific object is an object having a defined color determined in advance.

9. The information processing apparatus according to claim 1, wherein the display device displays preview of the data before printing the data.

10. The information processing apparatus according to claim 1, wherein:
the display device is configured to display a user interface comprising a first button, a second button, and an image; and
the display device is configured to, in response to selection of the first button, change the image from the first reference logical page to the second reference logical page.

11. The information processing apparatus according to claim 10, wherein the display device is further configured to, in response to selection of the second button, change the image from the first reference logical page to the at least one first logical page.

12. The information processing apparatus according to claim 11, wherein the user interface further comprises a window to receive input of a page number, and the display device is configured to, in response to receipt of the page number input via the window, display a logical page corresponding to page number input via the window.

13. The information processing apparatus according to claim 12, wherein the display device displays a first number of pages and a second number of pages, the first number of pages being the total number of logical pages associated with the first document section and the second number of pages being the total number of physical pages of document data.

14. A method of controlling an information processing apparatus that stores data having a plurality of pages, and displays the data on a page-by-page basis according to a display instruction, comprising:
extracting consecutive pages of each of document sections of the data, as logical pages, in association with physical page numbers each sequentially assigned to each at least one of the pages of the data;
deciding a leading logical page of each document section, as a reference logical page such that a first document section includes a first reference logical page sequentially connected to at least one first logical page and a second document section includes a second reference logical page sequentially connected to at least one second logical page, the first reference logical page being further sequentially connected to the second reference logical page;
consecutively displaying, in a first case, the first reference logical page and the second reference logical page one page at a time, and consecutively displaying, in a second case, the first reference logical page and the at least one first logical page one page at a time; and
simultaneously displaying, when the data is displayed, information indicative of a total number of physical pages contained in the data, information indicative of a total number of logical pages of a document section including a page being displayed, and information indicative of a position of the page being displayed in a sequence of all of the logical pages.

15. A non-transitory computer-readable storage medium storing a computer-executable program for causing a computer to execute a method of controlling an information processing apparatus that stores data having a plurality of pages, and displays the data on a page-by-page basis according to a display instruction;
wherein the method comprises:
extracting consecutive pages of each of document sections of the data, as logical pages, in association with physical page numbers each sequentially assigned to each at least one of the pages of the data;
deciding a leading logical page of each document section, as a reference logical page such that a first document section includes a first reference logical page sequentially connected to at least one first logical page and a second document section includes a second reference logical page sequentially connected to at least one second logical page, the first reference logical page being further sequentially connected to the second reference logical page;
consecutively displaying, in a first case, the first reference logical page and the second reference logical page one page at a time, and consecutively displaying, in a second case, the first reference logical page and the at least one first logical page one page at a time; and
simultaneously displaying, when the data is displayed, information indicative of a total number of physical pages contained in the data, information indicative of a total number of logical pages of a document section including a page being displayed, and information indicative of a position of the page being displayed in a sequence of all of the logical pages.

* * * * *